Aug. 4, 1964  R. J. HAZELBAKER  3,142,965
DUAL ACTION MASTER BRAKE CYLINDER ASSEMBLY
Filed Sept. 20, 1963  4 Sheets-Sheet 1

INVENTOR
R. J. HAZELBAKER

BY Jacobi & Davidson
ATTORNEYS

Aug. 4, 1964     R. J. HAZELBAKER     3,142,965
DUAL ACTION MASTER BRAKE CYLINDER ASSEMBLY
Filed Sept. 20, 1963     4 Sheets-Sheet 2

Raymond J. Hazelbaker
INVENTOR
BY Jacobi & Davidson
ATTORNEYS

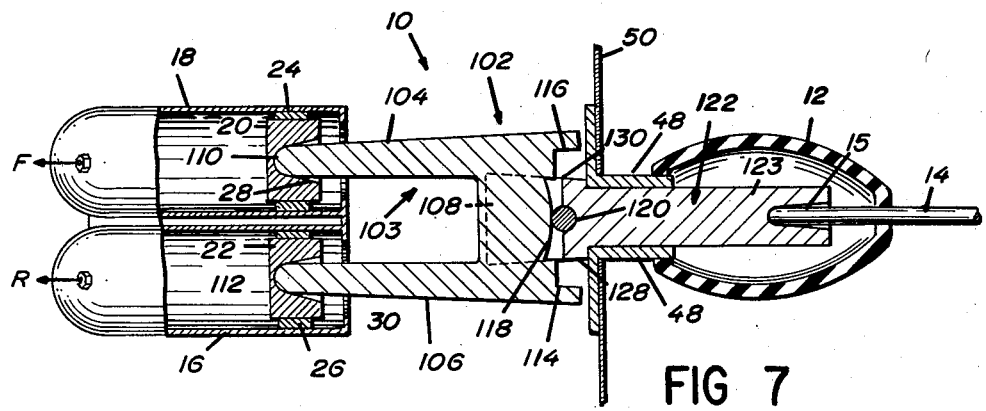
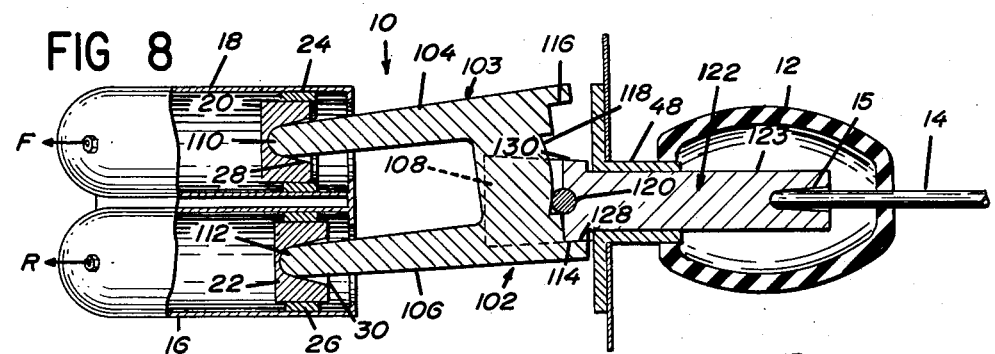
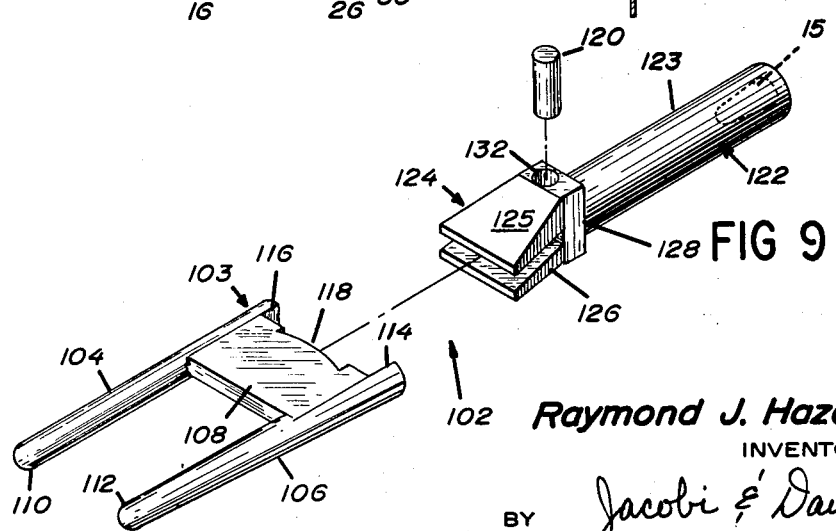

Aug. 4, 1964  R. J. HAZELBAKER  3,142,965
DUAL ACTION MASTER BRAKE CYLINDER ASSEMBLY
Filed Sept. 20, 1963  4 Sheets-Sheet 4
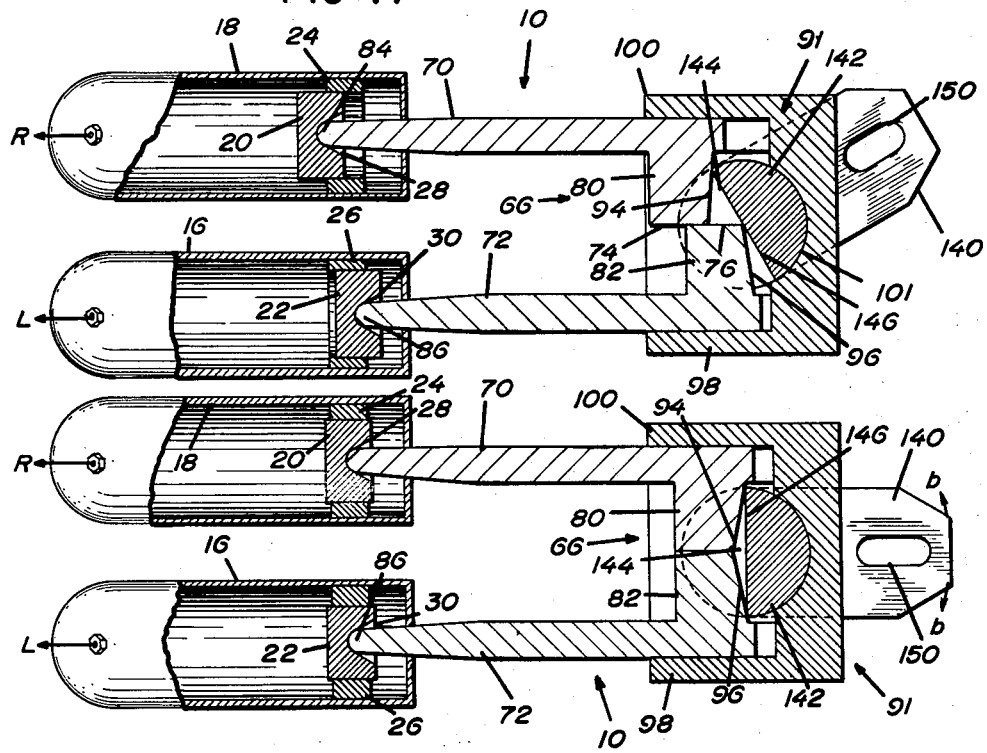
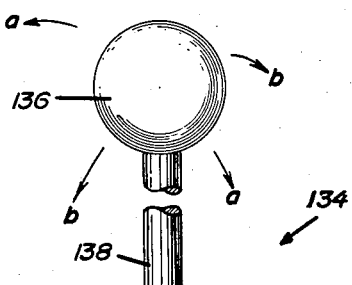
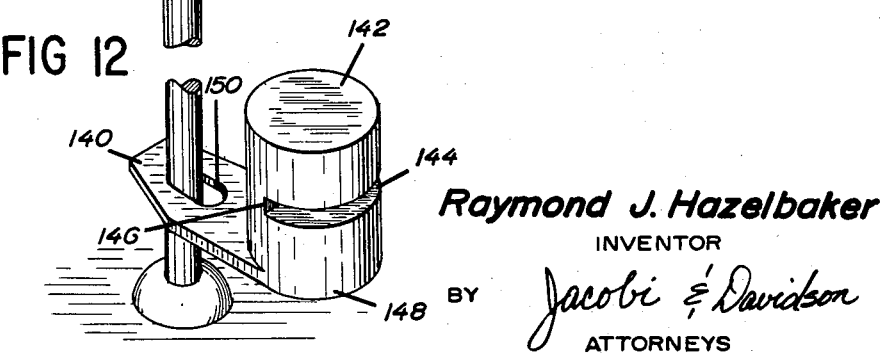
Raymond J. Hazelbaker
INVENTOR
BY Jacobi & Davidson
ATTORNEYS

United States Patent Office 3,142,965
Patented Aug. 4, 1964

3,142,965
DUAL ACTION MASTER BRAKE CYLINDER ASSEMBLY
Raymond J. Hazelbaker, 11 Woodlawn Ave., Uniontown, Pa.
Filed Sept. 20, 1963, Ser. No. 310,429
23 Claims. (Cl. 60—54.6)

This application is a continuation-in-part of my copending application, Serial No. 200,709, filed June 7, 1962, now abandoned.

The present invention relates to a dual action master brake cylinder assembly, for use in vehicular and aircraft braking systems, including such systems as used on automobiles, trucks, buses and aircraft, whether or not the same be of the power or manual type. Particularly, the invention is concerned with such units in which there is provided a connecting assembly between an actuator and pistons of dual master cylinders. This assembly can be supported in a housing mounted on the firewall, floor or frame of the vehicle or aircraft in any known manner.

In present day automobiles, hydraulic brakes are actuated by the driver of the automobile when he applies pressure to a brake pedal to cause a piston in a master cylinder to move and thereby force brake fluid out of the master cylinder and to four wheel cylinders, individually positioned at each wheel assembly of the automobile. The individual wheel cylinders have pistons in them which are caused to move by the brake fluid urged into the brake cylinders by the piston of the master cylinder. Movement of the wheel cylinder pistons is transferred to expandable brake shoes which are thereby moved into engagement with the individual brake drums. Likewise, in present day aircraft braking and steering systems, an actuator or brake stick is moved so as to cause a piston in a master brake cylinder to move and thereby force brake fluid to one or more of the individual wheel cylinders.

It has long been known that the brake systems presently used and as generally described above, are deficient from a safety view point because of the fact that if there is a leak or break at any one point in the system, such as a break in a hose leading to one of the wheel cylinders, the entire braking system will thereby be made inoperable. This is because the fluid will immediately run out of the brake when the foot pedal or brake stick is actuated, and no fluid or pressure will be transferred to any of the wheel cylinders.

To overcome this deficiency in roadway vehicles, there has heretofore been proposed a different system in which two master cylinders were provided, one being connected with the wheel cylinders of the two front wheels, and the other being connected with the wheel cylinders of the two rear wheels. This system has the advantage that when there is a leak at one place, such as at the right front wheel, the rear wheel brakes may nevertheless be applied, since the motion of the brake pedal will cause the piston in the master cylinder which is connected to the rear brake cylinders to be moved, and the rear brake system will thereby function in its normal manner. While these brake systems with two master cylinders have heretofore been generally satisfactory in solving the major problems, their constructions have often been extremely expensive, requiring a great number of parts, many of which move relative to each other and thereby being subject to wear. These brake systems further require a great many bearing surfaces which have to be machined. These characteristic constructional features, therefore, resulted in units which were extremely complex, which were expensive to manufacture, which were subject to considerable wear and which were thereby subject to overly frequent and costly repairs.

In addition, the dual master cylinder units of the prior art were provided with two separate tanks for holding reserve fluid, thus giving rise to the hazard that a mechanic would fill only one of the tanks, erroneously supposing that this was the only tank in the brake system which required attention.

Accordingly, the present invention has as its primary object the provision of a dual action master brake cylinder assembly which insures the availability of adequate braking power to a wheeled vehicle even when one of the individual wheel systems has failed, and such system has become unavailable for braking purposes.

More specifically, a primary object of the present invention is to provide a dual action master brake cylinder assembly having a single actuator for the operation of a plurality of braking systems.

A further object of the instant invention is to provide an actuator for a dual piston-cylinder master assembly which actuator is capable of applying full braking power to either one or both of the pistons or like members in the two cylinders so that upon failure of either of the brake systems, adequate pressure is applied to the remaining operable piston in order to provide braking power to the vehicle.

Another object of the instant invention is to provide a dual action master brake cylinder assembly conforming with the preceding objects of the invention and incorporating an arcuately contoured coupling member engaged between the single actuating member and the push rods of the assembly.

Another object of the instant invention is to provide a dual action master brake cylinder assembly in which the coupling member permits free movement of either one of the push rods when brake failure occurs in either one of the master brake cylinders or in individual wheel cylinders of the vehicle. In this manner, the push rod cooperating with the operable master piston and cylinder of the brake system remains in contacting relation with the coupling member when pressure is applied by means of a brake pedal to the actuator, whereby sufficient braking power is transmitted to the wheels of the vehicle which are in the operable brake system of the braking assembly.

Still further, yet additional and primary objects of the present invention are (a) to provide a dual action master brake cylinder assembly of improved construction and operation; (b) to provide a braking system having few parts and few moving parts, which is economical to manufacture; (c) to provide a dual action master brake assembly having an improved brake fluid tank; (d) to provide an improved brake fluid tank having separate sections therein connected to separate fluid lines of the braking system; (e) to provide a new braking system which affords a more direct approach, following brake failure, to operate the brakes which remain operable so as to sufficiently stop the vehicle; (f) to provide a dual action master brake system which is capable of a braking operation alone and/or a steering operation through the use of a control stick with separate and selective operation of one or more master brake cylinders and pistons.

Another and still further object of the present invention is to provide a dual action master brake system assembly conforming with the preceding objects of the invention, which in addition leaves "full" brake pressure to those wheel units and corresponding master cylinder and piston from which no leakage or failure has occurred, thereby preventing a swerving of the vehicle or loss of control by the operator during a braking operation.

Still another and important primary operation of the present invention is the provision of a coupling member between the actuator and dual brake cylinders, which coupling member equalizes the applied pressure to both braking systems when there is an absence of brake failure in either one of the lines.

A still further object of the present invention is the provision of a dual action master brake cylinder assembly which provides a definite and positive relation between the brake pedal, stick or the like and the active or operable fluid brake line in case of failure of the other fluid brake line, so as to permit the active or operable brake system to function properly and efficiently to meet the emergency presented.

Still another yet more specific object of the present invention is the provision of a dual action master brake cylinder assembly wherein a piston is reciprocably mounted in each of the dual cylinders, an actuating means is reciprocal in response to brake pedal or stick pressure, and a connecting assembly between the dual pistons and actuating means comprises a push rod assembly and an arcuate member mounted between the actuating means and the push rod asssembly.

These and still other objects and the entire scope of applicability of the present invention will become apparent when consideration is given to the following detailed description of the dual action master brake cylinder assembly. Such description makes reference to the annexed drawings presenting preferred embodiments of the invention therein.

FIGURE 7 is an axial cross-sectional view of a dual action master brake cylinder assembly constructed in accordance with another modified embodiment, showing the use of a modified coupling assembly.

FIGURE 8 is a view similar to FIGURE 7, showing the modified construction in operating position following a failure in one of the brake lines of the system.

FIGURE 9 is a perspective view of the connecting assembly used in the embodiment of FIGURES 7 and 8.

FIGURE 10 is an axial cross-sectional view of a dual action master brake cylinder constructed in accordance with still another modified embodiment and showing the use of a modified coupling assembly which is adapted for use in aircraft brake systems or steering systems.

FIGURE 11 is a view similar to FIGURE 10, but showing the modified construction in operating position following either a failure in one of the brake lines or a steering operation where one of the brake lines is actuated to brake one side of the aircraft.

FIGURE 12 is a perspective view of the control stick and coupling assembly for the modified construction shown in FIGURES 10 and 11.

Figure 1:
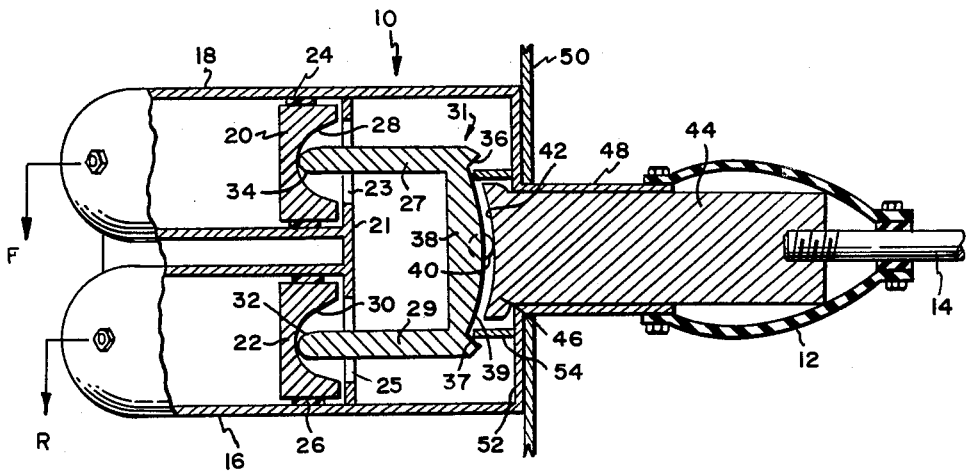
FIGURE 1 is an axial cross-sectional view of a dual action master brake cylinder unit constructed in accordance with the present invention.
Figure 2:
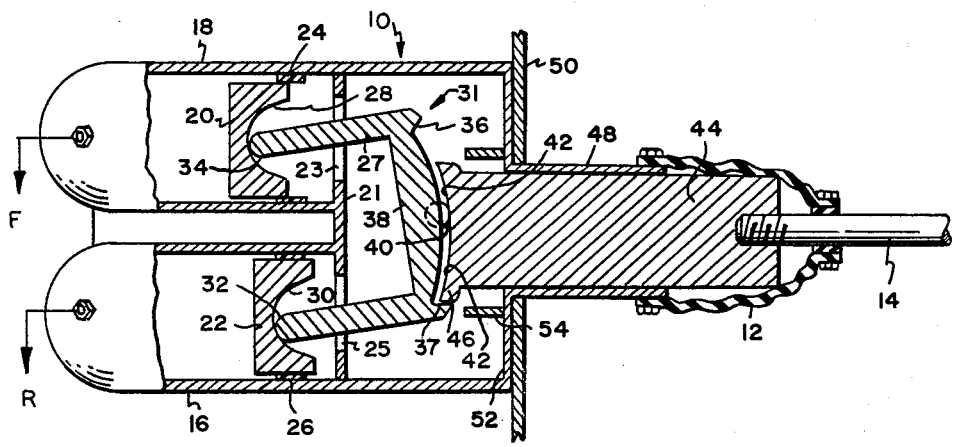
FIGURE 2 is a view similar to FIGURE 1 but showing the parts in operating position following a failure in one of the brake lines of the system.

Referring now to the drawings, wherein like or corresponding reference numerals are used to designate like or corresponding parts throughout the several views, there is shown in FIGURE 1 a preferred embodiment of the dual action master brake cylinder unit 10 which can be conveniently mounted on a firewall 50 of an automobile, trick, bus or the like in known manner. Unit 10 comprises a pair of master brake cylinders 16 and 18, arranged with their longitudinal axes parallel to one another. Cylinders 16 and 18 are connected, respectively, with the brake systems for the forward and rear wheels as indicated by the letters F and R. In each of the master cylinders 16 and 18, respectively, a reciprocably mounted piston 22 and 20, respectively, is supported. Pistons 20 and 22 are substantially identical and each has a concavity 28, 30, in the rear face thereof. Suitable sealing members 24 and 26 are located in the cylinders and move with the pistons 20 and 22, respectively, as their motion is shown in FIGURE 2, i.e., the seal moves with the pistons so as to prevent leakage of fluid rearwardly of the pistons during their axial sliding motion. Rearward motion of the pistons 20 and 22 is limited by a stop wall 21 having a pair of openings 23 and 25 therethrough. This wall can be formed by a washer with enlarged holes 23 and 25 maintained in place by a conventional spring clip to thereby facilitate removal of pistons 20 and 22.

Engaging with the concavities 28 and 30 of the pistons 20 and 22 is a U-shaped connecting assembly 31 including a pair of push rods 27, 29 which have rounded ends 34 and 32, respectively. The rounded ends 32 and 34 of the U-shaped connecting assembly 31 engage the concavities of pistons 20 and 22 when the connecting assembly is in the normal operating position shown in FIGURE 1. The bight portion 38 of the U-shaped connecting assembly 31 is characterized by an arcuate face 39, which extends as a narrow band parallel to the plane of the paper. In the arcuate face 39, there is rotatably mounted a sphere 40. At its ends arcuate face 39 is bounded by abutments 36 and 37.

Sphere 40 can be either a ball bearing or roller bearing, engaging with a concave face or band 42 of an actuator 44, slidably received in a sleeve 48. Actuator 44 is disposed rearwardly of and between the master cylinders 16 and 18, and has an enlarged head portion 46 at the forward end thereof. A guide 54 is mounted on the rear wall 52 and serves to maintain the orientation of the actuator 44. The enlarged head 46 serves as a stop, however, when it engages the wall 52.

Actuator 44 may be suitably connected to a brake rod 14 which is connected to a brake pedal, or the like, and a suitable rubber boot 12 is connected between the rod 14 and sleeve 48 to prevent the entry of dirt and other foreign matter into the brake assembly.

In operation, the dual master cylinders 16 and 18 and the corresponding fluid brake systems connected to them will be filled with brake fluid in known manner. When it is desired to apply the brakes, the brake rod 14 will be moved to the left by a brake pedal or the like, thereby causing the actuator 44, sphere 40 and the push rod assembly 31 to move to the left. Under normal circumstances, the pistons 20 and 22 will be driven uniformly to the left, by virtue of their engagement with the rounded ends 32 and 34 of the push rods 27 and 29. In this manner, the front and rear brakes will be applied uniformly.

However, when there is a leakage in one of the systems, such as the system connecting master cylinder 18 with the front wheel cylinders, the result will be as shown in FIGURE 2. Upon movement of actuator 44 to the left there will be relatively little resistance from the fluid in master cylinder 18, and therefore piston 20 will move freely to the left, while in contrast there will be considerable resistance from the fluid contained within master cylinder 16 and the brake line extending therefrom.

Accordingly, little pressure applied to the brake pedal, will move the U-shaped connecting assembly 31 into the position shown in FIGURE 2. Sphere 40 will now be in engagement with a lateral part of the arcuate face 42 rather than with the center part thereof. Further, brake pedal pressure will continue to urge brake rod 14, actuator 44, and connecting assembly 31 to the left, with the force being transmitted through sphere 40 and the abutting portions of the connecting assembly 31 and actuator 44, i.e., the abutment 37 and the side of the enlarged head 46.

The return of piston 22 to the "brake-off" position will be effected in the normal manner and the connecting assembly 31 will remain in the position shown while pressure is applied, always ready for instant use, until the system connected with master cylinder 18 is returned to normal operation.

Figure 3:
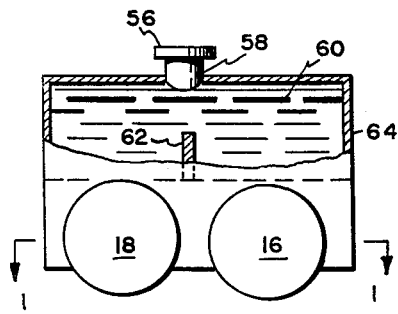
FIGURE 3 is a front elevational view, with parts in section, of a dual action master brake cylinder assembly reservoir constructed in accordance with the present invention.

Referring now to FIGURE 3, it will be seen that the master cylinders 16 and 18 are partly within a unitary tank structure 64 which is provided at its top surface with a single filler neck 58 closed by a cap 56. A divider wall 62 rises from the floor of the tank to approximately three-fourths of the height thereof. Wall 62 divides the tank 64 into two separate and distinct compartments below the top level thereof since it extends from front to rear of the tank 64. There is thereby provided a separate reservoir compartment for each of the master cylinders 16 and 18, respectively, so that even if a leak occurs in either of the hydraulic systems, the fluid will not drain out of the entire brake system but the remaining operable system will retain a three-fourths reserverse supply of fluid therein. Also, brake fluid introduced into the tank 64 through the filler neck 58 will be distributed equally to both of the compartments by the divider wall.

Figure 4:
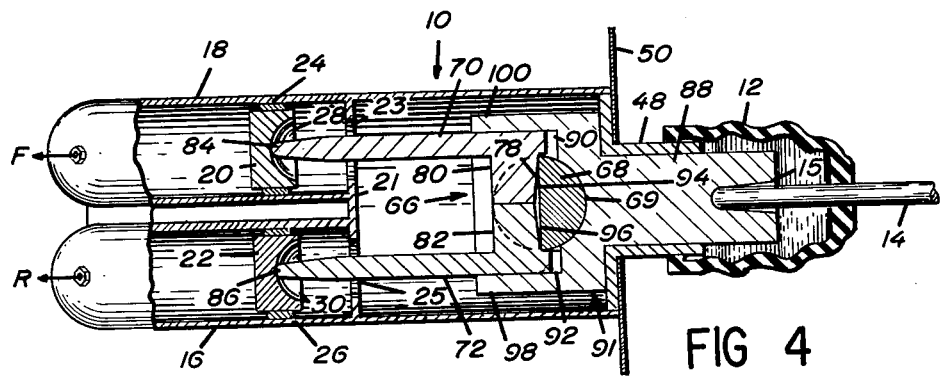
FIGURE 4 is an axial cross-sectional view of a dual action master brake cylinder assembly constructed in accordance with a modified embodiment of the present invention.
Figure 5:
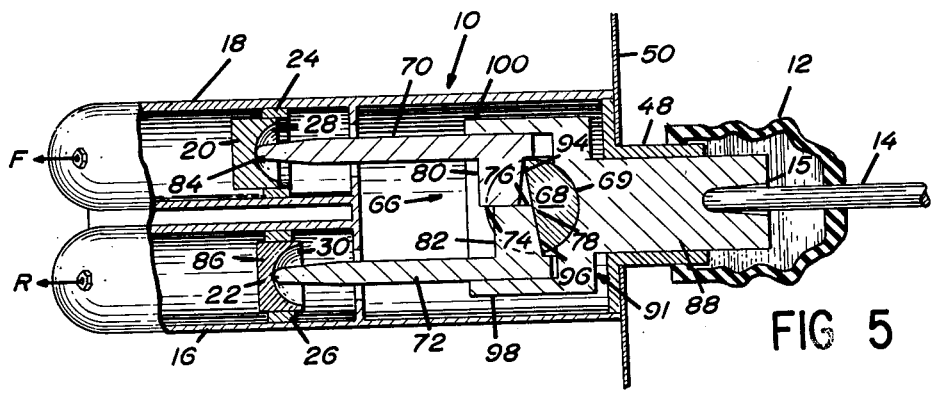
FIGURE 5 is a view similar to FIGURE 4, but showing the modified embodiment in operating position following a failure in one of the brake lines of the system.
Figure 6:
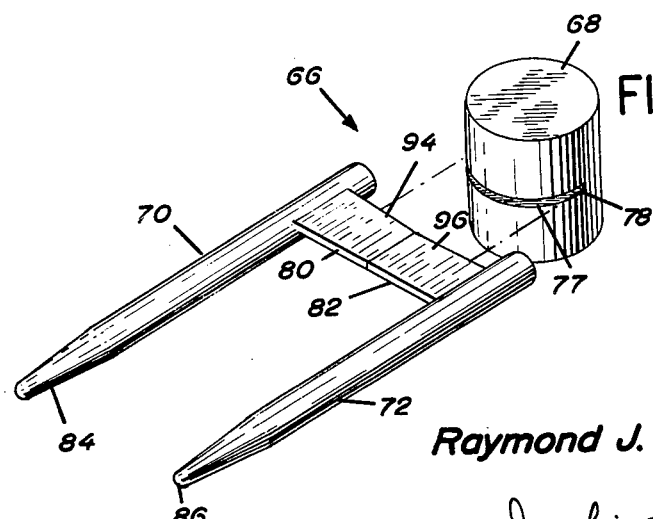
FIGURE 6 is a perspective view of the connecting assembly used in the embodiment of FIGURES 5 and 6.

In FIGURES 4 through 6 there is shown a modified construction of the dual master cylinder brake assembly wherein the elongated cylinders 16 and 18 are disposed in parallel relation to one another as in the embodiment shown in FIGURES 1 through 3. Similarly, a piston 22 is axially slidable in the master cylinder 16 and piston 20 is axially slidable in the master cylinder 18. Cylinders 16 and 18, are connected to the forward and rear brake systems, respectively, as indicated in FIGURES 4 and 5 by the letters F and R. The pistons 20 and 22 in this modified embodiment also have concavities 28 and 30 in the rear faces thereof. Sealing means 24 and 26 are slidable with the pistons in the cylinders 16 and 18 so as to prevent leakage of fluid from the cylinders.

Engaging with the concavities 28 and 30 of the pistons 20 and 22 is a connecting assembly 66 including a pair of push rods 70, 72 having rounded end portions 84, 86. At the rearward end of the connecting assembly 66, the push rods 70, 72 are interconnected by means of the transversely extending bight portions 80, 82 which are slidably engaged with each other as seen in FIGURE 5. As seen in FIGURE 6, the bight portions 80, 82 of the connecting assembly 66 have inclined surfaces 94 and 96 engaging the flat portion 78 of a cylindrical coupling member 68 through the slot 77 therein.

Coupling member 68 engages the actuating member 88 along the arcuate face 69 in the end guide portion 91 thereof. The guide portion 91 of the actuating member 88 includes a pair of extending guide members 98, 100 for guiding the push rods 70, 72 along the inner surfaces 90, 92. In this manner the push rods are axially slidable with their outer edges slidably engaging the guide portion 91, and slidably engaged with each other along the surfaces 74, 76. Actuating member 88 has at its rearward end a slot 15 for engaging the brake rod 14 which is connected in known manner to a brake pedal or the like. A suitable rubber boot 12 is connected between the brake rod 14 and sleeve 48 to prevent the entry of dirt and other foreign matter into the brake assembly.

In operation, the dual master cylinders 16 and 18 and the fluid brake systems connected thereto will be filled with brake fluid in known manner as was done in the embodiment of FIGURES 1 through 3. When it is desired to apply the brakes under normal conditions, the brake rod 14 will be moved to the left thereby causing the actuator 88, coupling member 68, and the connecting assembly 66 to move to the left. Under normal circumstances, the pistons 20 and 22 will be driven uniformly to the left, by virtue of the engagement of the rounded ends 84 and 86 of the push rods 70 and 72, thereby applying uniform pressure to the front and rear wheel cylinders.

However, when there is a leakage in one of the lines of the brake system, such as the system connecting master cylinder 18 with the front wheel cylinders, the result will be as shown in FIGURE 5. Upon movement of the actuator 88 to the left, there will be relatively little resistance from the fluid in master cylinder 18, and therefore piston 20 will move easily to the left, while in contrast there will be considerable resistance from the fluid contained within master cylinders 16 and the brake line extending therefrom.

Accordingly, the coupling member 68 will rotate within the arcuate slot 69 maintaining its engagement with the interconnecting members 80 and 82 along the flat surface 78, as shown in FIGURE 5. The push rod 70 will move to the left and thereby move piston 20 within the cylinder 18. It being noted that coupling member 68 is now in engagement with the inclined surface 96 of the interconnecting portion 82 of push rod 72. Continued pressure by the brake rod 14 and actuator 88 upon the coupling member 68 will force the push rod 72 of connecting assembly 66 to the left and thereby cause piston 22 to exert brake pressure to the rear wheels.

The return of the piston 22 to the full "brake-off" position will be effected in the normal manner and push rod 72 will remain in the position shown while pressure is applied, always ready for instant use, until the system connected with master cylinder 18 is returned to normal operation.

In the modified embodiment of FIGURES 7 through 9, identical cylinders, pistons, brake rod and rubber sleeve are used in the same manner as was discussed in connection with the embodiments described above. However, a modified construction of the connecting assembly and actuating member is utilized. More specifically, the connecting assembly 102 comprises an integral U-shaped member 103 including a pair of push rods 104, 106, which have rounded ends 110, 112, respectively, engaging the concavities 28, 30, of the pistons 20 and 22. A bight portion 108 interconnects the push rods at their rear ends so that uniform and equal pressure is applied to both brake systems of the assembly. At the rear face of the interconnecting bight portion 108 an arcuate surface 118 is disposed medially of the end portions of the connecting assembly. The arcuate face 118 which extends as a narrow band parallel to the plane of the paper, is engaged by a rotatably mounted cylindrical pin 120 which is supported in the enlarged head portion 124 of the actuating member 122. Aligned apertures 132 are provided at the rear part of the enlarged head 124 for rotatably supporting the cylindrical pin 120. As more clearly seen in FIGURE 9, the actuating member 122 includes a slot 15 at its rearward end for engagement with the brake rod 14 and has an enlarged head 124 at the forward end thereof. The sleeve 48 guides the actuating member 122 and also serves as a stop for rearward travel of the actuating member by abutting against the enlarged head portion 124. This enlarged head portion 124 has a slot disposed parallel to the upper portion 125 and lower portion 126 of the enlarged head for engaging the bight portion 108 of the coupling member 102.

In operation, the dual master cylinders 16 and 18 and the fluid brake systems connected to them are filled with brake fluid as described in connection with the preceding embodiments. When it is desired to apply the brakes in this embodiment, the brake rod 14 will be moved to the left thereby causing the actuator 122, and the cylindrical coupling member 120 to also move to the left and toward the dual cylinders. In response to this movement, the connecting assembly 102 including the push rods 104, 106 will be moved to the left, thereby causing the application of pressure to the forward and rear wheel brake systems by means of the pistons 20, 22.

However, when there is a leakage in one of the systems, such as that shown in FIGURE 8 in connection with the master cylinder 18 and the front wheel cylinders, the connecting assembly will assume the position shown in FIGURE 8. Upon movement of the actuator 122 to the left there will be relatively little resistance from the fluid in master cylinder 18 and therefore piston 20 will move freely to the left, while in contrast there will be considerable resistance from the fluid contained within master cylinder 16 and the brake line extending therefrom. Coupling member 120 will now be abutting against the end portion of the arcuate surface 118 of the connecting assembly when one of the brake systems has undergone a failure, as shown in FIGURE 10. When such failure has occurred, one of the abutting segments of the connecting assembly, namely, member 114 will be abutting against the side or edge portion of the head 124 of actuator 122.

The return of the piston 22 to the "brake-off" position will be effected in the normal manner and the connecting assembly 102 will remain in the position shown in FIGURE 8 while pressure is applied, always ready for instant use, until the system connected with master cylinder 18 is returned to normal operation.

A further embodiment of the instant invention is shown in FIGURES 11 through 12. This embodiment is adapted for use in aircraft braking and steering systems as well as roadway vehicles. Substantial similarity of construction should be noted between this embodiment and the embodiment disclosed in FIGURES 4 through 6. However, it should be noted that a modified actuating means has been provided.

The instant embodiment, utilizes push rods 70, 72 interconnected by the transversely extending portions 80, 82 slidably engaging each other along the surfaces 74, 76 and guided by the guide members 98 and 100. An actuating member 134 including a slotted longitudinally extending plate 140 is operataed by a control or "joy" stick 138 having a handle or knob portion 136 at its upper end thereof. At the forward end of the plate 140 is mounted a coupling member 142. The coupling member 142 has at least one arcuately contoured surface area which permits rotational engagement with the forward arcuately contoured slot 101 of the guide member 91.

Through the use of the control stick 138 the actuating plate 140 can be either moved to the right or to the left shown by the arrows designated B in FIGURES 10 and 12, for purposes of "steering by braking." In this manner, if the aircraft is to be turned to the right the operator would move the control stick 138 to his right thereby applying pressure through the coupling member 142 to the push rod 70 and corresponding piston 20 for braking the righ side of the aircraft. Movement of the left wheel would then turn the aircraft in the direction of the wheel which has been braked.

It should be noted in connection with this embodiment, however, that a brake failure in one of the systems, such as the system connecting master cylinder 18 with the right wheel cylinder of the aircraft will also result in the members assuming the position shown in FIGURE 11 when pressure in cylinder 18 has been reduced through a leakage in the system. In such a case the push rod 70 will move to the left under little resistance while the resistance in cylinder 16 is maintained so that the push rod 72 remains in the position shown in FIGURE 11. In such case the operator in order to brake the aircraft would move the control stick 138 forwardly and to his left so that pressure would be applied through the coupling member 142, push rod 72, and through the cylinder 16 by means of the axially slidable piston 22 therein. The slotted construction of the coupling member 142 as shown at 144 is substantially the same as that shown in the embodiment of FIGURE 6, but could be of a double slot construction where the aircraft braking system required substantially more pressure on the wheel cylinders. In such case, the second slot would lie in the same vertical plane as the slot 144 shown in FIGURE 12 but above said first slot. An actuating plate 140 is provided for supporting the coupling member in this embodiment.

It will be obvious to those skilled in the art that various changes may be made without departing from the spirit of the invention and, therefore, the invention is not limited to what is shown in the drawings and described in the specification, but only as indicated in the appended claims.

What is claimed is:

1. In a brake system or the like, a pair of parallel master cylinders, a pair of pistons axially slidable in said master cylinders, each piston having a concavity in the rear face thereof, an actuator rearwardly of and between said cylinders and adapted to be moved by a brake pedal, said actuator having a concave face on the end thereof towards said pistons, and a U-shaped connecting assembly between said pistons and said actuator, said U-shaped connecting assembly having a pair of push rods with rounded ends each engaging in the concavities of the rear faces of said pistons and having a sphere rotatably mounted in the surface of the bight thereof facing said concave face of said actuator, said sphere resting against said concave face.

2. The apparatus of claim 1, said connecting assembly having abutments at the ends of said surface of said bight each adapted to engage with said actuator upon rotational movement of said connecting assembly so that said sphere is at a lateral portion of said actuator concave face.

3. The apparatus of claim 1, said actuator having an enlarged head at the end thereof closest said master cylinders, and a guide for engaging said head during at least part of its travel.

4. The apparatus of claim 3, said guide being in line with said connecting assembly for engagement therewith to limit the rearward movement thereof.

5. In a brake system or the like, a pair of parallel master cylinders, a pair of pistons axially slidable in said master cylinders, each piston having a concavity in the face thereof, an actuator rearwardly of and between said cylinders and adapted to be moved by a brake pedal, said actuator having a face on the end thereof directed towards said pistons, and a U-shaped connecting assembly between said pistons and said actuator, said U-shaped connecting assembly having a pair of push rods with rounded ends each engaging in the concavities of the rear faces of said pistons and having a sphere rotatably mounted in the surface of the bight thereof facing said face of said actuator, said sphere resting against said face.

6. In a brake system or the like, a pair of parallel master cylinders, a pair of pistons axially slidable in said master cylinders, an actuator rearwardly of and between said cylinders and adapted to be moved by a brake pedal, said actuator having a face on the end thereof directed towards said pistons, and a U-shaped connecting assembly between said pistons and said actuator, said U-shaped connecting assembly having a pair of push rods with the ends thereof in operative engagement with said pistons and having a sphere rotatably mounted on the surface of the bight thereof facing said face of said actuator, said sphere resting against said face.

7. In a brake system or the like, a pair of parallel master cylinders, a pair of pistons axially slidable in said master cylinders, an actuator rearwardly of and between said cylinders and adapted to be moved by a brake pedal, said actuator having a face on the end thereof directed towards said pistons, and a connecting assembly between said pistons and said actuator, said connecting assembly having a pair of push rods each in operative, relatively movable engagement with one of said pistons, and having means engaging the said face of said actuator for movement thereon, said means comprising a sphere rotatably carried by said connecting assembly.

8. In a brake system or the like:
   (a) a pair of elongated cylinders disposed in parallel relation to one another;
   (b) a pair of pistons, each of said pistons being axially slidable in a different one of said cylinders;
   (c) a connecting assembly including a pair of push rods, each push rod being engageable with one of said pistons to move the piston engaged therewith in one direction; and means interconnecting said push rods for simultaneous movement in said one direction;
   (d) an actuating means, and
   (e) a coupling member engaged between said actuating means and said means interconnecting said push rods, said coupling member having at least one arcuately contoured surface area permitting rotation of said coupling member relative to at least one of said means.

9. The brake system or the like defined in claim 8, wherein said means interconnecting said push rods includes a pair of slidably engaged heads, said heads each engaging said coupling member.

10. The brake system or the like of claim 8 wherein said means interconnecting said push rods includes a unitary cross member carrying said push rods at opposed ends thereof.

11. In a brake system or the like, a pair of elongated cylinders disposed in parallel relation to one another, a pair of pistons, each of said pistons being axially slidable in a different one of said cylinders and each of said pistons having a concavity in the rear face thereof, an actuating means disposed rearwardly of and between said pair of cylinders, connecting means including a pair of push rods, each push rod being engageable with the concavity in one of said pistons to move the piston engaged therewith in one direction, means interconnecting said push rods for simultaneous movement in said one direction, a sphere rotatably mounted between said interconnecting means and said actuating means whereby said interconnecting means is capable of transverse movement relative to said actuating means.

12. In a brake system or the like:
   (a) a pair of elongated cylinders disposed in parallel relation to one another;
   (b) a pair of pistons, each of said pistons being axially slidable in a different one of said cylinders;
   (c) a connecting assembly including a pair of push rods, each push rod being engageable with one of said pistons to move the piston engaged therewith in one direction; and means interconnecting said push rods for simultaneous movement in said one direction;
   (d) said interconnecting means having a convex surface facing away from said pistons;
   (e) an actuating means, and a coupling member engaged between said actuating means and the convex surface of said interconnecting means, said coupling member having a spherical shape thereby permitting rotation of said coupling member relative to at least one of said means, and transverse movement of said interconnecting means.

13. The brake system or the like defined in claim 12 wherein said means interconnecting said push rods includes a unitary cross member carrying said push rods at opposed ends thereof.

14. The brake system or the like defined in claim 13 wherein said means interconnecting said push rods having said convex surface thereon further includes abutment means for engagement with said actuating means.

15. In a brake system or the like, a pair of elongated cylinders disposed in parallel relation to one another, a pair of pistons, each of said pistons being axially slidable in a different one of said cylinders, an actuating means adapted to be moved by a brake pedal or the like, said actuating means having a U-shaped guide portion on the end thereof directed toward said cylinders, a connecting assembly including a pair of push rods, each push rod being slidably disposed within said guide portion of said actuating means and engageable with one of said pistons to move the piston engaged therewith in one direction, and a coupling member engaged between said actuating means and the end of each of said push rods disposed within said U-shaped guide portion of said actuator, said coupling member having at least one arcuately contoured surface area permitting rotation of said coupling member relative to said actuating means.

16. In a brake system or the like,
   (a) a pair of elongated cylinders disposed in parallel relation to one another;
   (b) a pair of pistons, each of said pistons being axially slidable in a different one of said cylinders;
   (c) a connecting assembly including a U-shaped member having a pair of push rods extending therefrom, each rod being engageable with one of said pistons to move the piston engaged therewith in one direction, and a bight portion of said U-shaped member interconnecting said push rods for simultaneous movement in said one direction;
   (d) an actuating means; and
   (e) a coupling member engaged between said actuating means and said interconnecting bight portion, said coupling member comprising a rotatable sphere mounted in the end of said actuating means facing said interconnecting bight portion.

17. The brake system or the like, defined in claim 16 wherein said interconnecting bight portion is partially of a convex shape in the direction toward said actuating means whereby said rotatable sphere permits a pivoting transverse movement of said connecting assembly.

18. The apparatus of claim 17 further comprising an abutment means at each side of said connecting assembly for engagement with said actuating means when said connecting assembly pivots transversely to said actuating means in the direction of either one of the pair of said push rods.

19. In a brake system or the like:
   (a) a pair of elongated cylinders disposed in parallel relation to one another;
   (b) a pair of pistons, each of said pistons being axially slidable in a different one of said cylinders;
   (c) a connecting assembly including a pair of push rods, each push rod being engageable with one of said pistons to move the piston engaged therewith in one direction; and means interconnecting said push rods for simultaneous movement in said one direction;
   (d) an actuating means; and
   (e) a coupling member attached to the top of said actuating means, said coupling member having at least one arcuately contoured surface area permitting rotation of said coupling member relative to said interconnecting means.

20. The brake system or the like defined in claim 19 wherein said means interconnecting said push rods includes a pair of slidably engaged heads, said heads each engaging said coupling member.

21. In a brake system or the like, a pair of parallel master cylinders, a pair of pistons axially slidable in said master cylinders, an actuator rearwardly of and between said cylinders and adapted to be moved by a brake pedal, said actuator having an arcuate face on the end thereof directed towards said pistons, and an integral connecting assembly between said pistons and said actuator, said integral connecting assembly having a pair of push rods fixed thereto each of said push rods being disposed in operative, relatively movable engageable with one of said pistons, and having an arcuately contoured means engaging the said arcuate face of said actuator for movement thereon.

22. The apparatus of claim 21, and further including abutment means on the end of said connecting assembly directed towards said actuator for engagement therewith upon movement of said connecting assembly relative to said actuator.

23. The apparatus of claim 21, and a tank having a wall therein dividing said tank into two compartments, each said compartment being fluid connected with said master cylinder, a filler neck above said wall, and baffle plate means for distributing fluid introduced through said filler neck into said two compartments.

References Cited in the file of this patent

UNITED STATES PATENTS

| | | |
|---|---|---|
| 2,018,685 | Sauzedde | Oct. 29, 1935 |
| 2,160,074 | La Brie | May 30, 1939 |
| 2,596,119 | Blackman | May 13, 1952 |
| 2,694,191 | Falanga et al. | Nov. 9, 1954 |
| 3,058,309 | Smith | Oct. 16, 1962 |

FOREIGN PATENTS

| | | |
|---|---|---|
| 309,470 | Great Britain | Apr. 11, 1929 |